Figure 1:
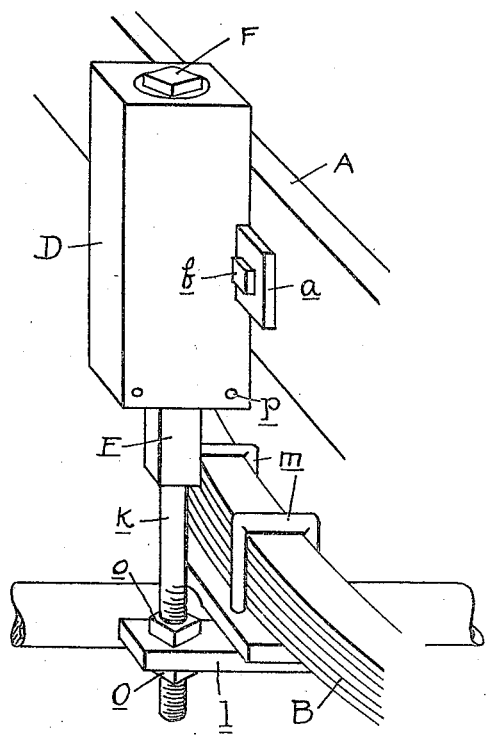

G. W. BOLTON, Jr.
SHOCK ABSORBER.
APPLICATION FILED DEC. 15, 1906.

964,201.

Patented July 12, 1910.
2 SHEETS—SHEET 1.

WITNESSES

INVENTOR
George W. Bolton, Jr.

BY

ATTYS.

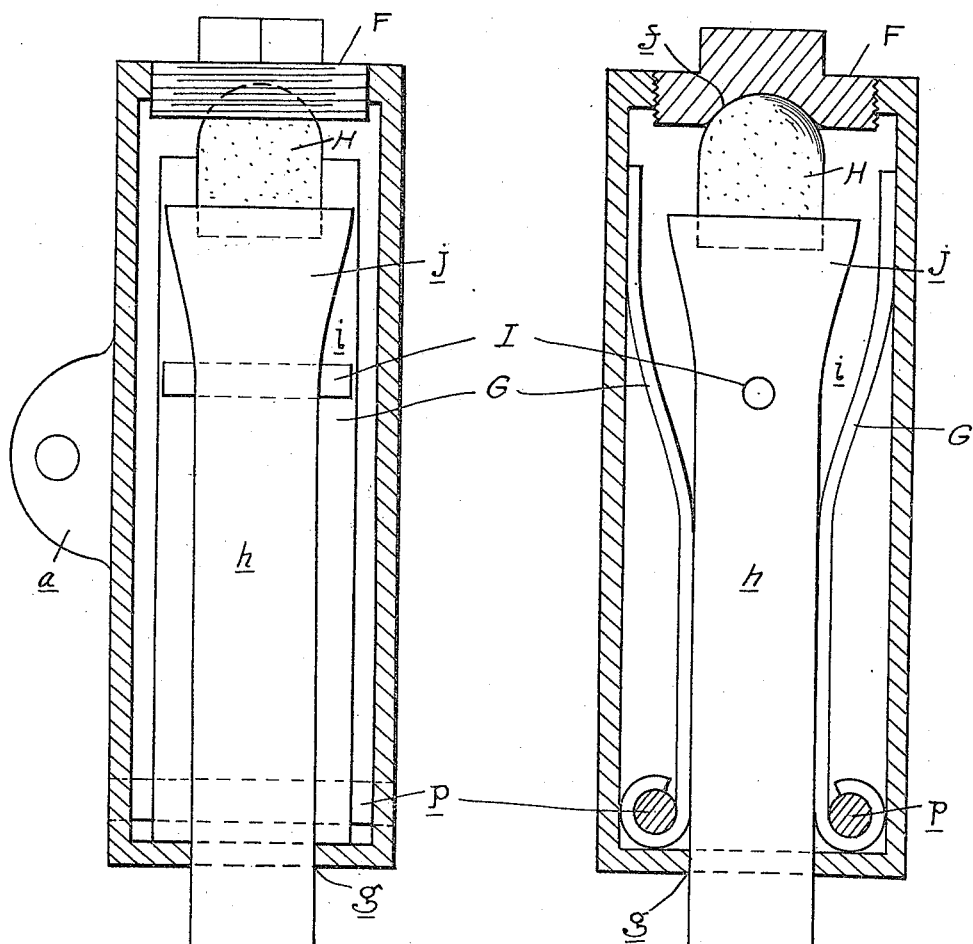

UNITED STATES PATENT OFFICE.

GEORGE W. BOLTON, JR., OF DETROIT, MICHIGAN.

SHOCK-ABSORBER.

964,201.  Specification of Letters Patent.  Patented July 12, 1910.

Application filed December 15, 1906. Serial No. 348,024.

*To all whom it may concern:*

Be it known that I, GEORGE W. BOLTON, Jr., a citizen of the United States of America, residing at Detroit, in the county of Wayne and State of Michigan, have invented certain new and useful Improvements in Shock-Absorbers, of which the following is a specification, reference being had therein to the accompanying drawings.

The invention relates generally to shock absorbers especially designed for use in connection with vehicles for alleviating any undue strain on the springs, and reducing the rebound of the vehicle body when traveling over rough roads or passing over obstructions or ruts in the road.

It consists in the novel construction thereof and in the peculiar arrangement and combination of the parts, as will be more fully hereinafter set forth.

In the drawings, Figure 1 is a perspective view of my improved shock absorber applied to a vehicle; Fig. 2 is a vertical central section therethrough; and Fig. 3 is a similar section taken at right angles to Fig. 2.

In the drawings thus briefly described, A designates the usual body of a vehicle of any construction, and B the supporting spring therefor, the members constituting relatively movable abutments. Intermediate these abutments is the shock absorber, composed of two relatively reciprocal members D E, connected to the abutments, as hereinafter set forth. The member D is preferably in the form of a casing, in this instance rigidly attached to the vehicle body by means of ears $a$ and bolts $b$. The casing is apertured at its top, in which is fitted a threaded plug F having an inner concave face $f$. The lower end of the casing is provided with an opening $g$, through which projects and extends upwardly within the casing the complementary member of the shock absorber, preferably in the form of a plunger. In construction, the plunger comprises a body section $h$, preferably of uniform diameter to a point, as $i$, near its free end. Beyond this point the body is enlarged, so as to form extensions, as $j$, which project laterally beyond the body proper, as plainly indicated in Fig. 2. The opposite end of the plunger terminates in a threaded shank $k$, which is attached to the spring B by means of a plate $l$, secured to the spring by the usual spring clips $m$ and nuts $o$, the shank extending through the plate as indicated in Fig. 1, and the nuts serving to provide an adjustable connection, for a purpose hereinafter set forth.

Within the casing D described are two leaf springs G, secured at their lower ends by means of pins $p$ to the casing, and arranged upon opposite sides of the plunger, as shown in Fig. 2. These springs are so fashioned that they will have preferably no material bearing against the main body of the plunger, but will be depressed or flattened by the enlarged or head portion thereof as it is drawn downwardly within the casing.

Intermediate the upper or headed end of the plunger and the casing top is a yielding abutment H, in this instance in the form of a rubber bumper, the latter being carried preferably by the plunger, and adapted at times to abut against the concave face $f$ of the plug, previously described.

I represents a stop pin extending through and upon opposite sides of the plunger, and serves to limit its extreme downward movement, the pin ends being adapted to strike against the lower end of the casing, in which the plunger reciprocates.

In operation, the shock absorber being applied to the vehicle in the manner described, the proper adjustment is effected by means of the adjustable connection between the plunger and the supporting spring of the vehicle to bring the laterally projecting portions or enlargement upon the plunger body in close proximity to the leaf springs, or in contact therewith, this position being the normal one that the parts assume in ordinary travel. Upon the downward movement of the body, caused by striking an obstruction or rut, a relative reciprocation is effected between the shock absorber parts, the enlarged or headed portion of the plunger passing upwardly within the casing to near the top. Upon the reaction of the spring, the vehicle body moves upwardly, causing the springs within the casing to be compressed by the plunger, as previously described, thus retarding the reciprocation and producing the desired result of relieving the spring and reducing the jolt. In instances where downward movement of the vehicle body is considerable, the upward reciprocation of the plunger is retarded by means of the yielding abutment H, the buffer striking in extreme instances the plug in the casing described.

The opening in the casing top closed by the plug F is of sufficient size to permit of the insertion or withdrawal of the plunger within the casing, and the pins $p$ are detachable. By this construction, all of the parts of the shock absorber may be conveniently removed for repair, replacement, or cleansing.

Attention is directed to the fact that by reason of the peculiar construction of the shock absorber, either of the reciprocating members, i. e. the casing or the plunger, may be attached to the vehicle body, or the spring, which is a desirable feature, as in some instances the application of the box or casing to the body, or to the spring, is not practical. Furthermore, it will be understood that either of the reciprocating members of the absorber may be attached to the axle, if desired, in preference to the spring.

What I claim as my invention is,—

1. A shock absorber, comprising a casing, a plunger therein having a lateral projection, a resilient member within the casing in the path of the plunger projection, and a yielding abutment intermediate the casing and the plunger end.

2. In a shock absorber, the combination with a casing and a headed plunger therein arranged for relative reciprocatory movement, of a resilient member inclosed in said casing and bearing at one end against the side thereof and arranged to frictionally engage the head of said plunger on the reciprocation of the casing and plunger.

3. In a shock absorber, the combination with a casing and a headed plunger therein arranged for relative reciprocatory movement, of a resilient member interposed between the plunger and the casing side, and having a constant bearing on the casing side and arranged to frictionally engage the plunger head at different points in the reciprocation thereof.

4. In a shock absorber, the combination with a casing having apertures in both ends, and a headed plunger passing through one of said apertures and arranged for relative reciprocatory movement, of means for frictionally resisting the relative movement of the two in one direction, a removable plug for the other aperture in said casing and a yielding abutment on the plunger head arranged to engage with said plug.

5. In a shock absorber, the combination with a casing and a headed plunger therein arranged for relative reciprocatory movement, of resilient means for frictionally resisting said movement, a yielding abutment forming a stop for limiting the movement in one direction, and a pin carried by said plunger for engaging the casing to form a stop for limiting said movement in the opposite direction.

6. In a shock absorber, the combination with a casing, of a headed plunger therein arranged for relative reciprocatory movement, and a resilient member interposed between the plunger and the wall of the casing adapted upon relative reciprocation of the casing and plunger to have a progressively increasing frictional sliding engagement with the plunger.

7. The combination with relatively movable abutments, of a shock absorber including a casing connected to one of said abutments, a resilient member anchored within the casing, a head connected to the other abutment positioned within the casing for relative oscillatory movement, and adapted to have a progressively increasing frictional engagement with said resilient member upon relative movement of the abutments.

8. The combination with relatively movable abutments, of a shock absorber comprising a casing connected to one of said abutments, a plurality of leaf springs having their opposite ends in engagement with the casing, a portion of each spring intermediate its ends being spaced from the casing, a head connected to the other abutment positioned within the casing for relative oscillatory movement, and adapted to frictionally engage the intermediate portions of the springs.

9. The combination with relatively movable abutments, of a shock absorber comprising a pair of spaced independent leaf springs, means carried by one of said abutments to which one end of each spring is anchored, means engaging the opposite end of the springs for limiting the spreading movement of the latter, the last-mentioned ends of the springs being arranged for relative longitudinal travel in relation to each other and to the said last-mentioned means, a head carried by the other abutment positioned between said springs and adapted upon relative movement of the abutments to have a progressively increasing frictional engagement with the springs.

In testimony whereof I affix my signature in presence of two witnesses.

GEORGE W. BOLTON, Jr.

Witnesses:
　AMELIA WILLIAMS,
　JAMES P. BARRY.